(No Model.)   8 Sheets—Sheet 1.

Z. HOROVSKY.
APPARATUS FOR THE MANUFACTURE OF TUBING.

No. 529,910.   Patented Nov. 27, 1894.

(No Model.) 8 Sheets—Sheet 2.
Z. HOROVSKY.
APPARATUS FOR THE MANUFACTURE OF TUBING.
No. 529,910. Patented Nov. 27, 1894.

Fig. 2.

WITNESSES. INVENTOR.
Zdenko Horovsky
By Kay Totten & Cooke
Attorneys (No Model.) 8 Sheets—Sheet 3.

Z. HOROVSKY.
APPARATUS FOR THE MANUFACTURE OF TUBING.

No. 529,910. Patented Nov. 27, 1894.

Fig. 3

WITNESSES:

INVENTOR,
Zdenko Horovsky
BY
Kay, Tatten & Cooke
ATTORNEYS.

THE NORRIS PETERS CO., PHOTO-LITHO., WASHINGTON, D. C.

(No Model.) 8 Sheets—Sheet 4.
Z. HOROVSKY.
APPARATUS FOR THE MANUFACTURE OF TUBING.

No. 529,910. Patented Nov. 27, 1894.

WITNESSES:

INVENTOR.

(No Model.) 8 Sheets—Sheet 6.

Z. HOROVSKY.
APPARATUS FOR THE MANUFACTURE OF TUBING.

No. 529,910. Patented Nov. 27, 1894.

WITNESSES:

INVENTOR
Zdenko Horovsky.
BY
Kay, Totten & Cooke
ATTORNEYS (No Model.) 8 Sheets—Sheet 7.

Z. HOROVSKY.
APPARATUS FOR THE MANUFACTURE OF TUBING.

No. 529,910. Patented Nov. 27, 1894.

WITNESSES:

INVENTOR.
Zdenko Horovsky.
BY
Kay, Totten & Cooke
ATTORNEYS.

(No Model.) 8 Sheets—Sheet 8.

Z. HOROVSKY.
APPARATUS FOR THE MANUFACTURE OF TUBING.

No. 529,910. Patented Nov. 27, 1894.

United States Patent Office.

ZDENKO HOROVSKY, OF DUQUESNE, PENNSYLVANIA.

APPARATUS FOR THE MANUFACTURE OF TUBING.

SPECIFICATION forming part of Letters Patent No. 529,910, dated November 27, 1894.

Application filed October 24, 1893. Serial No. 489,082. (No model.)

*To all whom it may concern:*

Be it known that I, ZDENKO HOROVSKY, a resident of Duquesne, in the county of Allegheny and State of Pennsylvania, have invented a new and useful Improvement in Apparatus for the Manufacture of Tubing; and I do hereby declare the following to be a full, clear, and exact description thereof.

My invention relates to the manufacture of tubing, and is more especially applicable to the formation of seamless tubing, though it may be employed in connection with the reduction of welded tubing after the welding of the same from the skelp. Its object is to provide for the supporting of the blank and its introduction into the rolls in connection with the internal mandrel in such a way as to enable the rapid and automatic re-introduction of the blank into the rolls so that the like blank may be reduced by rolling to the desired thickness and diameter in the ordinary class of two-high and three-high rolls, and the rapid formation of the tube from the blank accomplished.

The invention comprises, generally stated, a set of rolls having a series of concave passes, the passes being made successively smaller in diameter, tables on each side thereof adapted to support and carry the tube blank between the roll-passes, and mandrels supported on the tables and longitudinally movable thereon, each mandrel being adapted to enter the blank delivered onto the table, and when carried to another pass, to move longitudinally into the roll-pass so as to provide the interior mandrel for the rolling of the blank through that pass, the mandrels being made successively smaller in diameter, corresponding to the roll-passes, and in this way providing for the easy entering of the mandrel into the blank as it is delivered from the pass and the passage of the mandrel through the blank into the next roll-pass to provide for the reduction and elongation of the tube.

The particular points of invention desired to be covered will be hereinafter set forth and claimed.

To enable others skilled in the art to employ my invention I will describe the same more fully, referring to the accompanying drawings, in which—

Fig. 7 is a plan view and Fig. 8 a longitudinal section of apparatus embodying the invention such as I prefer to employ in the rolling of a blank after it has passed the first set of rolls.

Figure 1:
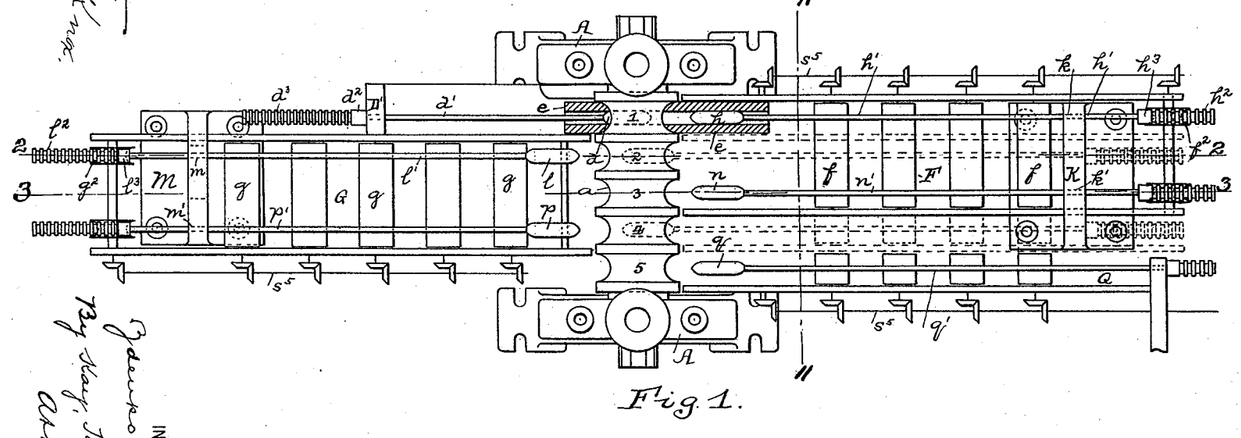
Figure 1 is a plan view of the apparatus.
Figure 2:
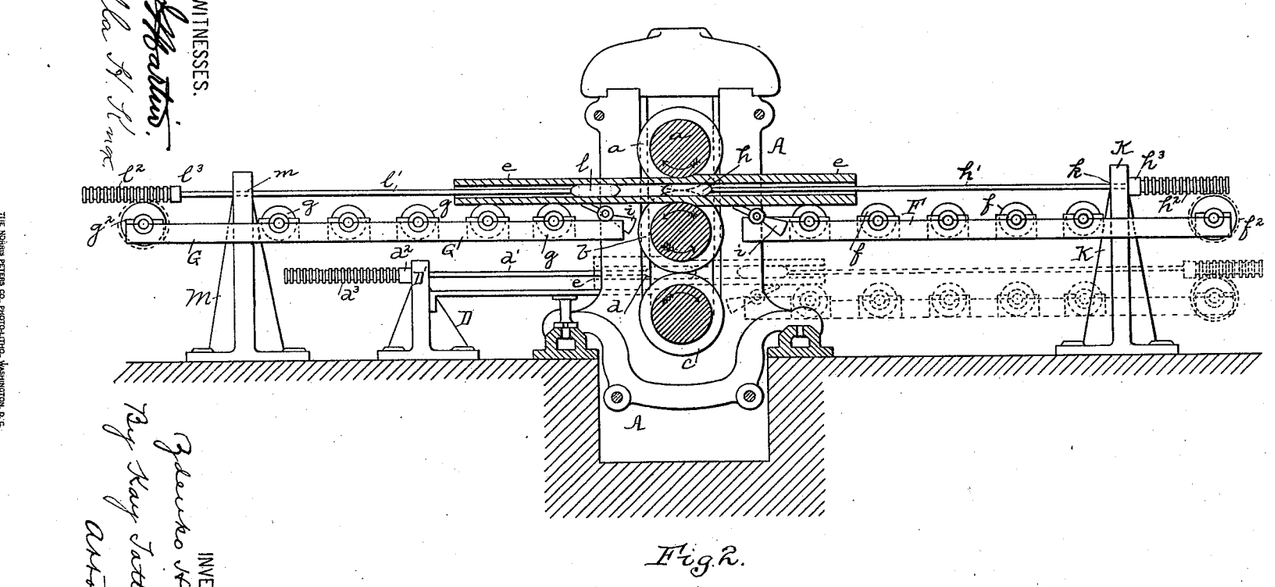
Fig. 2 is a longitudinal section on the line 2—2 Fig. 1 illustrating the first or primary rolling of the blank.
Figure 3:
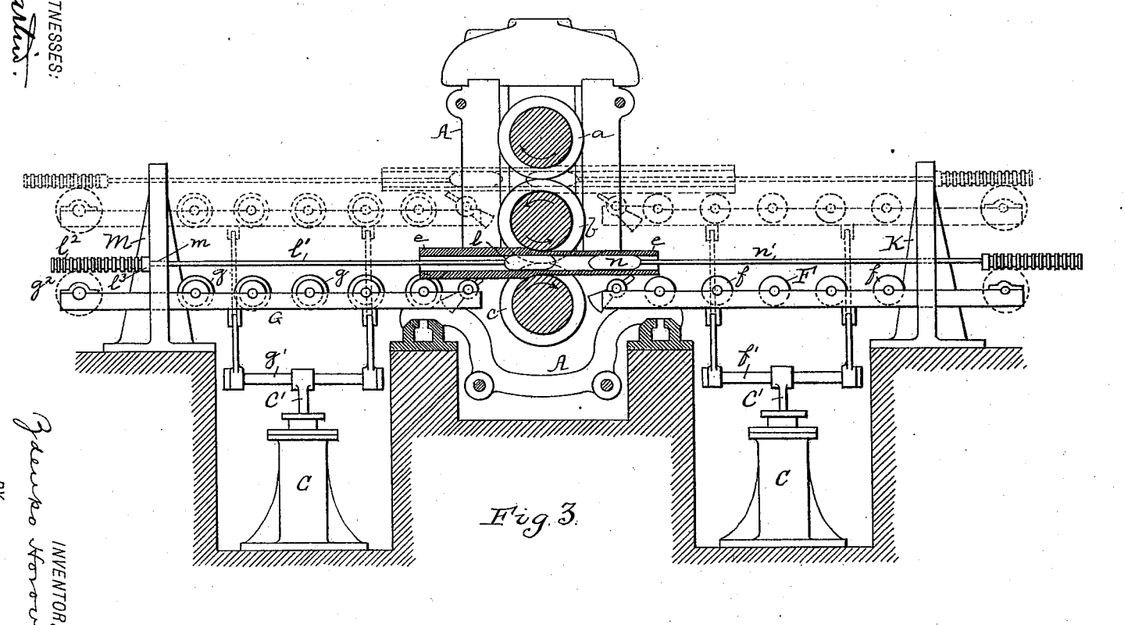
Fig. 3 is a longitudinal section on the line 3—3 Fig. 1 illustrating the subsequent rolling steps and illustrating one mandrel in the roll-pass and the other in position to receive the blank.
Figure 4:
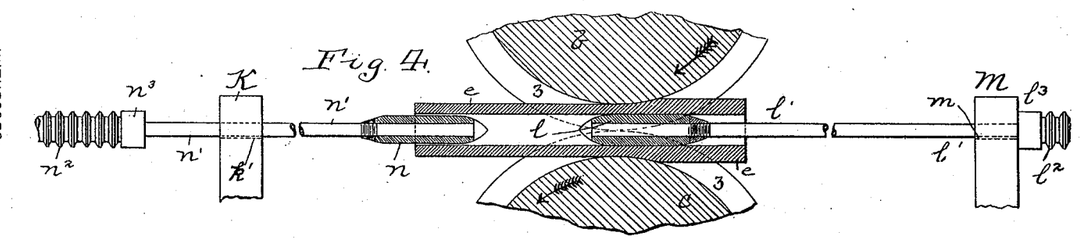
Figs. 4 and 5 are enlarged longitudinal detail sections, partly in full lines, illustrating the rolling operation.
Figure 5:
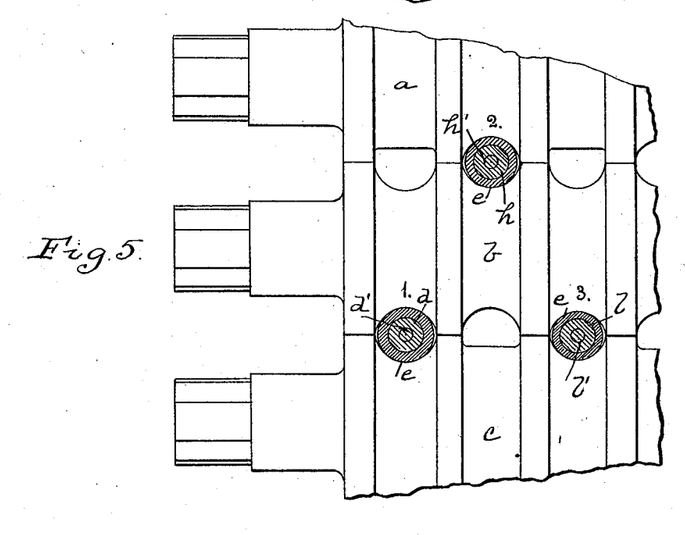

The roll housings A are of any suitable construction and have mounted therein the three rolls $a$, $b$, $c$, these rolls having formed therein the desired number of passes, the invention being illustrated in a set of rolls having five passes, numbered respectively from "1" to "5," and three of such passes being illustrated in the enlarged view of Fig. 5. The several roll-passes are made successively smaller in diameter according to the desired reduction in external diameter of the tube. In line with the pass "1", and mounted in a stationary frame D, is the mandrel $d$ which is carried on a bar $d'$, the rear end of which has a shoulder or abutment $d^2$ held against the body of the frame D, as at D', the mandrel bar $d^2$ carrying, if desired, at the rear end thereof a cogged face $d^3$ which can be arranged to contact with any suitable gearing for moving the mandrel longitudinally in the frame, such, for example, as where the mandrel is fed into the roll-pass "1" when the blank is first introduced into the apparatus for rolling, though this work can be accomplished by hand. The blank $e$ is preferably a hollow ingot cast to the desired size and then re-heated and placed upon the frame D, the mandrel $d$ being made very slightly smaller than the bore of the blank so that it may be introduced into the blank and then fed forward either ahead of or with the blank into the pass "1", so as to form the interior support for the rolling of the blank within the pass "1". I prefer to employ this primary stationary frame and mandrel for the initial rolling of the blank so as to support the blank in its first pass through the roll, especially in connection with the reduction of seamless blanks in the formation of seamless tubing, though it is to be understood that this mandrel need not be employed, the invention more especially relating to the subsequent rolling operations, such as the reception of the blank after reduction in the first pass, and the carrying of the same to the subsequent passes, as hereinafter described.

On each side of the set of rolls is a table, one table F being placed on the side opposite to the stationary frame D, while the other table G is placed on the same side as the frame D, but to one side thereof so as to receive the blank after it is handled on the table F. These tables are operated by any suitable mechanism so as to have an up and down movement for sufficient length to receive the blank at the lower pass and introduce it into the upper pass, or vice versa, hydraulic mechanism being preferred for this purpose, and to that end the tables are mounted in rams C, the frames $f'$, $g'$ of the tables extending downwardly and being connected to the piston rods C' of the rams, and the rams being controlled by suitable valve mechanism so as to provide for the upward or downward movement of the tables as found necessary in the rolling operation.

Figure 6:
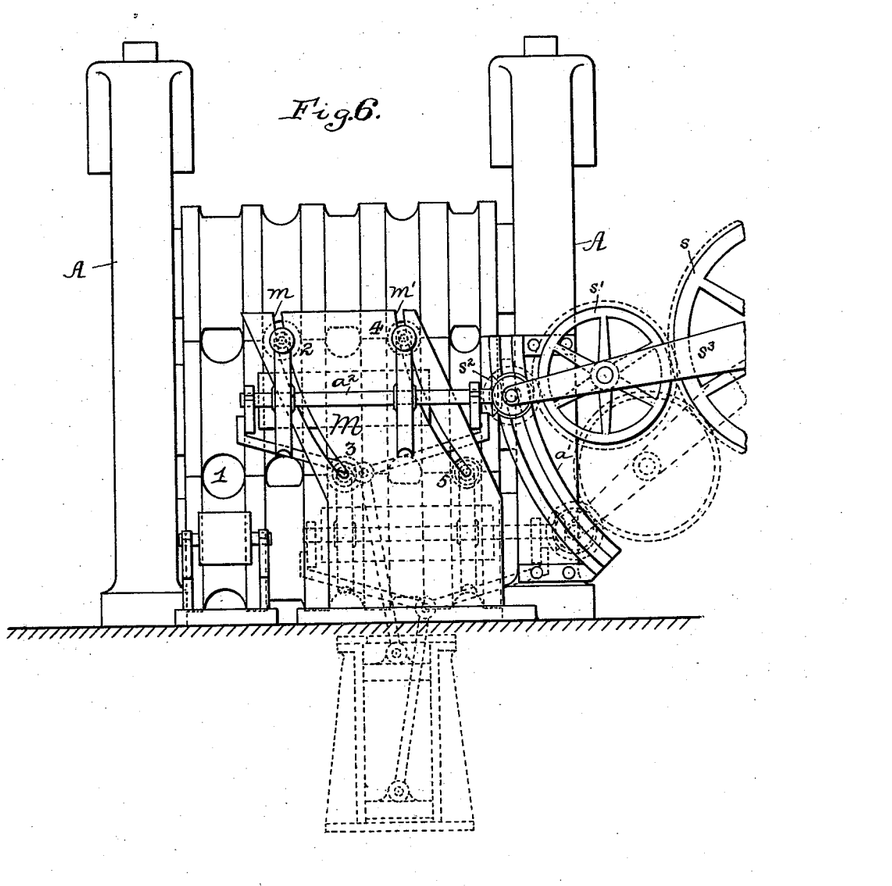
Fig. 6 is an enlarged face view of part of the rolls of a three-high mill illustrating my invention.

As the tables are required to swing laterally to some little extent, that is, for the distance between the two passes, as illustrated in dotted lines in Fig. 6, the frames $f'$, $g'$ are mounted on the piston rods in such way as to permit of this side movement. To impart this movement to the table I prefer to employ a slide or guideway $a'$ secured to the housing A, and a finger $a^2$ secured to the table F which fits in the guideway $a'$. This guideway is set on an incline corresponding with the desired movement of the table, and as the table is raised or lowered by the hydraulic apparatus it guides it from one pass to the other. It will be noticed that in Fig. 6 this guideway $a'$ is made curved or on an arc, so that in the movement of the table the gearing for operating the same may be held in the mesh. The gearing is shown at $s$, $s'$ Fig. 6, the power shaft being mounted in a stationary bearing and carrying a pinion $s$, the pinion $s^2$ being mounted upon the table, while the pinion $s'$ is a loose pinion mounted in the swinging frame $s^3$ which extends from the stationary bearing to the table. As so constructed it will be seen that when the table moves in the arc of the circle this gearing will remain in mesh.

The tables F, G carry a series of power-driven rollers $f$, $g$, respectively, these rollers being driven by any suitable gearing mechanism which will permit of the up and down movement of the table and provide for the driving of the rollers, such as the gearing $s$, $s'$, $s^2$ above referred to, and bevel gearing connected from the shaft $s^5$ to the rollers. The rolls are preferably straight faced, as shown in the drawings, and are in such line as to receive the blank from one pass and support it when carried to the next pass, the apparatus being so operated as to rotate the rolls in the desired direction either when receiving the blank or when feeding the same to the reducing passes of the main rolls. Mounted on each table is a series of mandrels, each table, for a set of rolls having five passes, carrying two such mandrels, which mandrels are held in line with the roll-passes and in front of the same so that when the blank is fed from one roll-pass it will be directed onto the mandrel held in line with that pass, passing around such mandrel so that the mandrel enters the blank as it is fed forwardly by the operation of the rolls. For example, the mandrel $h$ on the table F is in line with the pass "1" of the rolls, and as the blank $e$ passes from the rolls it will pass around the mandrel $h$, which is made very slightly smaller than the mandrel $d$ so as to give free entrance of the mandrel into the bore of the blank. The mandrel $h$ is carried upon a bar $h'$, and its forward end is supported in line with the pass upon a weighted dog $i$, which is mounted at the forward end of the frame F and has the finger $i'$ which, when held in a vertical position, supports the mandrel in line with the pass "1," the lower weighted end of the dog holding the finger in such vertical position; but as the dog can swing, the blank first passing onto the mandrel $h$ and then striking the dog $i$ and pushing it out of the way, as its sole function is to support the mandrel in line with the pass. The opposite end of the mandrel bar passes through a slot $k$ in the stand K, corresponding in curve to the guideway $a'$ above described, and its rear end rests upon the pinion $f^2$ mounted at the rear end of the frame, the mandrel having the cogged face $h^2$ which meshes with said pinion $f^2$, by means of which the mandrel bar can be moved longitudinally by the rotation of the pinion. On said mandrel bar $h'$ is the shoulder or abutment $h^3$, which bears against the stand K when the mandrel $h$ is in proper position between the rolls to give the interior support to the blank when passing through the same. The curved slot in the stand K is, as above stated, on the same curve as the guideway $a'$, and is curved in the same direction so that when the front of the table is drawn over by the guideway, as the back of the mandrel bar is traveling in the curved slot $k$, it is moved with the table and the entire bar in this way held in proper position on the table so that when the table moves obliquely to the next pass the like movement of the mandrel bar is insured. The pinion $f^2$, which is employed to hold the mandrel in its proper position in front of the roll-pass, that is, when the pinion is held from rotation, and also to feed the mandrel bar forward into the pass, may be operated by any suitable mechanism so as to be under the control of the operator; but as that class of mechanism is understood, it is not considered necessary to describe it. It will be seen that the slot $k$ in the stand K is open at the top so that the mandrel bar and its mandrel can be easily and quickly changed as desired.

The table G is guided in its movement in the same way as the table F and a like mandrel $l$ is mounted in the table, the mandrel being carried on the mandrel bar $l'$ having the cogged face $l^2$ and the shoulder $l^3$, corresponding to like parts on the mandrel bar $h'$, the mandrel being supported on a like dog $i$ on the table G, and a pinion $g^2$ mounted at the rear end of the table G, the pinion as well as the rollers $g$ on said table G being driven in the same way as above indicated in connection with like parts on the table F. The mandrel bar $l$ passes through the stand M, moving in a curved slot $m$ therein, these parts corresponding to the like parts in the stand K, but the curved slot being arranged to guide the mandrel from the pass "2" downwardly to the pass "3."

On the table F is also mounted the mandrel $n$ carried on the mandrel bar $n'$, having like parts to those above described, and supported and operated in like manner, the mandrel bar $n'$ fitting in a curved slot $k'$ in the stand K, and the mandrel $n$ being adapted to receive the blank from the roll-pass "3" and carry it to the roll-pass "4." In the table G is a like mandrel $p$ in line with pass "4," and carried on the mandrel bar $p'$ and having like parts to those described as to the other mandrels, the mandrel bar sliding in a curved slot $m'$, and the mandrel being adapted to carry the blank from the pass "4" to the pass "5." In line with pass "5" I may employ the mandrel $q$ on the mandrel bar $q'$ which is mounted in the table Q, which mandrel can be employed as a support for the blank and the means of feeding it into another like set of rolls, the mandrel bar $q'$ being mounted in such way as to be carried over to the first pass in the other set of rolls, such as those illustrated in Figs. 7 to 10, where the operation can be continued in the same manner as above described in the set of rolls illustrated. For ordinary purposes, however, where the blank is sufficiently reduced in this first set of rolls, the mandrel $q$ is not required.

Figure 8:
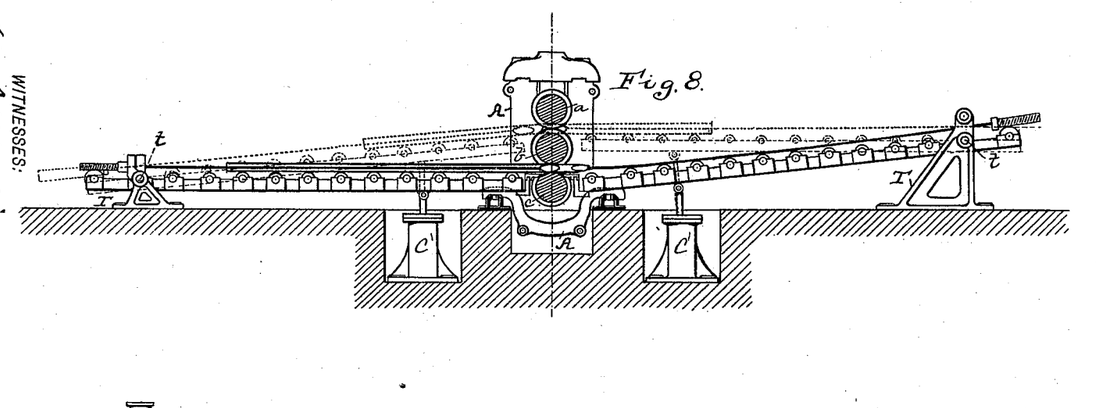
Figure 9:
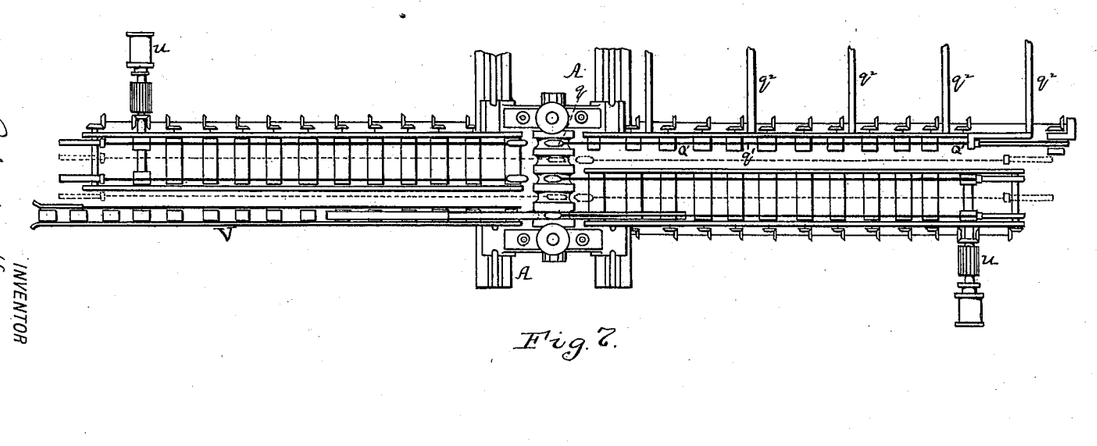
Figs. 9 and 10 are end views of such apparatus.
Figure 10:
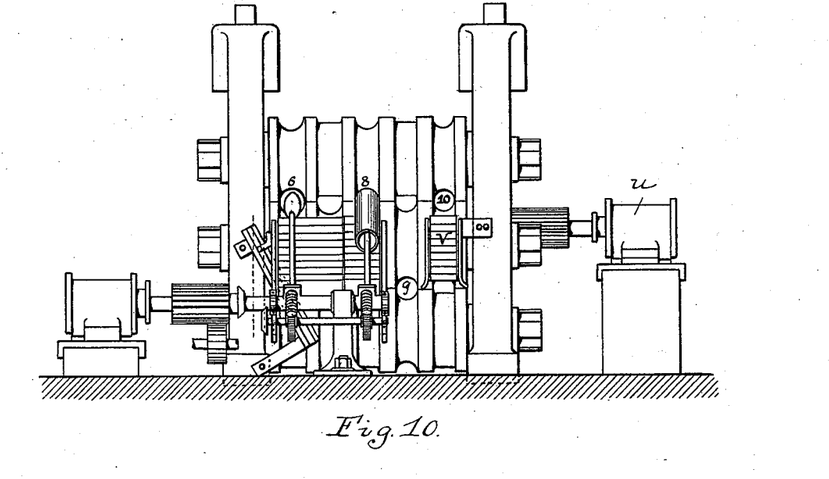
Figures 11, 12:
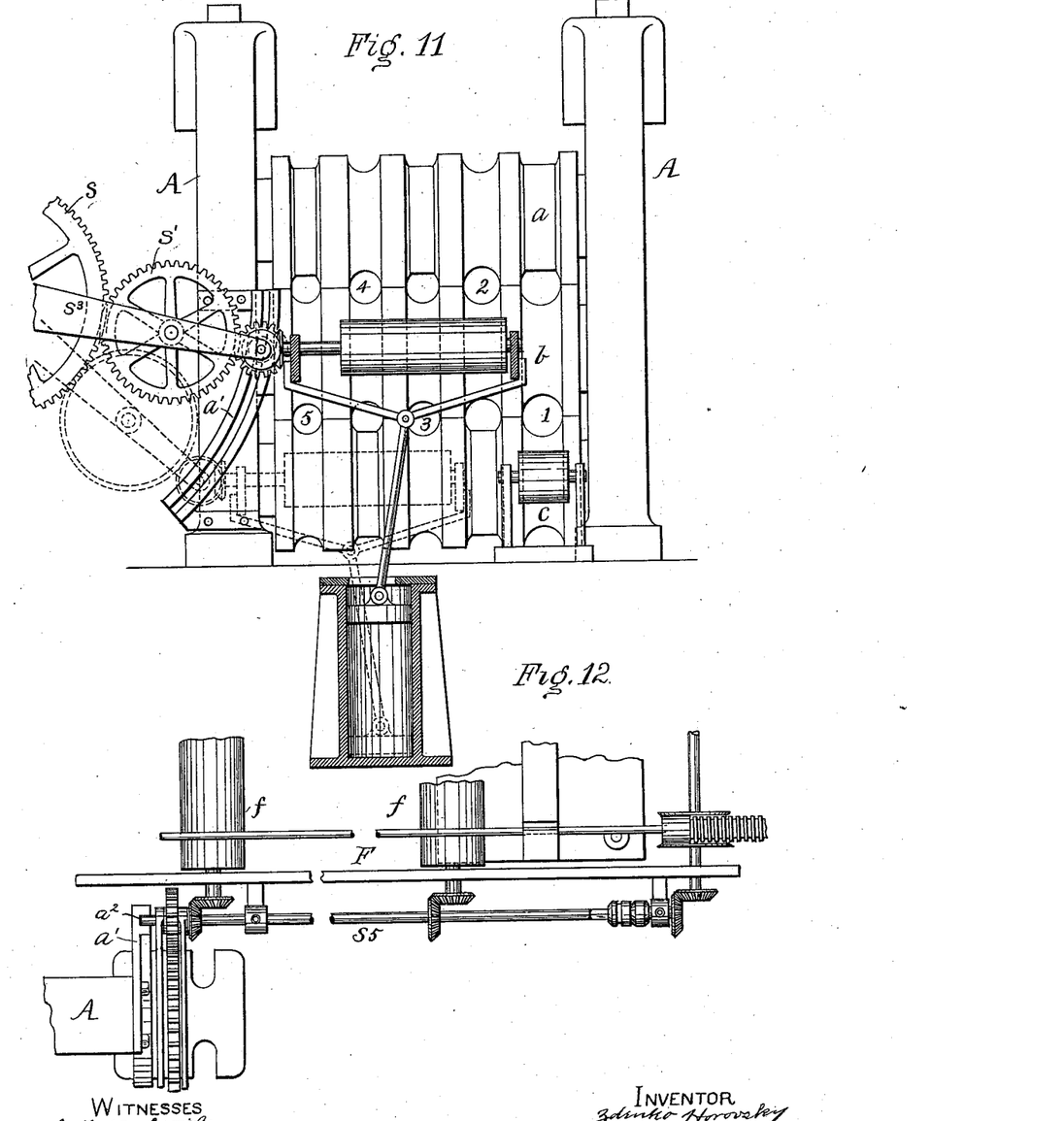
Fig. 11 is a cross-section on the line 11—11 Fig. 1.
Fig. 12 is a detail plan view of the table.

In Figs. 8 to 10 is illustrated another set of rolls with movable tables which can be employed in practicing my invention, and is preferably employed in rolling the tube when it reaches a considerable length, that is, after its reduction in the first set of rolls. As above stated, after the blank is reduced in the first set of rolls it is received on the mandrel $q$ and mandrel bar $q'$, and that mandrel $q$ can be brought by any suitable means, such as along the guide bars $q^2$, to a table Q' in line with the three-high mill shown in Figs. 7 and 8. Detailed description of these figures does not seem necessary, it being seen that they are composed of a three-high mill with tables moving upwardly and downwardly by means of hydraulic rams, but that said tables, instead of being carried bodily by the rams, are pivoted at their rear ends, as at $t$, and the rams are connected to the forward ends of the tables which swing in the standards or frames T, the pivotal point of one table being in horizontal plane with the upper pass of the three-high mill while the pivotal point of the other table is in horizontal plane with the lower pass of the three-high mill. The tables are so arranged because it is desired to direct the tube into the pass in a straight or horizontal line at right angles to the vertical axis of the set of rolls, but the slight deflection of the movement of the tables will not affect materially the tube as it passes onto the mandrel held in front of and in line with the pass. The rolls are shown with five roll-passes—"6," "7," "8," "9," "10." A like guideway is connected to the roll housing, and a like finger on the table guides the movement thereof, and in order to provide for the lateral movement of the table I prefer to employ at the rear end of each table, parallel with the standards T, the ram $u$, which engages with the shaft on which the rear end of the table is mounted, and moves the rear end of the table laterally for the distance between the passes at the same time that the ram C' at the forward end of the carriage is raising or lowering the table for the distance between the passes. These hydraulic rams can of course be operated automatically together, and in this way the desired result produced. Other than in the above points it does not seem necessary to describe the apparatus shown in these figures, as each table carries two mandrels with their bars, and the finished tube is received upon a stationary table or frame V onto which it is delivered from the last pass "10" in the mill.

In rolling the tubing in accordance with the invention the blank is raised to the proper heat and placed upon the frame D, and the mandrel bar $d'$ is then fed forward through the blank into such position that its mandrel $d$ is held between the pass "1" formed in the rolls $b$, $c$. The blank is then fed forward, and as it is engaged by the rolls it is compressed around the mandrel and is forced forward by the rolls so that it feeds onto the mandrel $h$ in line with the pass "1," knocking the dog $i$ which has supported said mandrel $h$, out of the way and passing onto the table F. The mandrel $h$ is slightly smaller than the mandrel $d$, so that the blank can pass freely around the same. As soon as the blank has passed onto the table, the table is raised through the hydraulic mechanism above described, and as it is raised is carried over laterally, so that both the blank and the mandrel $h$ are brought into line with the pass "2," and the mandrel and blank are then fed forward, by the movement of the pinion $f^2$ engaging with the mandrel bar, and the movement of the rollers *f* on the table, so that the mandrel is brought between the rolls *a, b* in the pass "2" in position for the reduction of the blank in that pass, and as the blank is forced forward by the rolls it is reduced around the mandrel *h*, and passes onto the mandrel *l* held in front of and in line with that pass, being received in the manner above described. As soon as the blank has passed onto the table G, which carries the mandrel *l*, that table is dropped by the hydraulic mechanism, and as it is dropped the mandrel *l* is brought into line with the pass "3," and the mandrel and blank are fed forward as above described, the blank passing onto the mandrel *n* in front of and in line with said pass. The table F is then raised and the mandrel and blank are carried into line with pass "4," and the mandrel *n* is carried between the rolls in said pass, and the blank reduced therein and fed onto the mandrel *p*. The table G is then lowered, the mandrel *p* brought into line with the pass "5," the mandrel *p* fed forward into said pass and the blank rolled therein around the mandrel, the blank being thus finished; or being fed onto the mandrel *q*, on which it is carried to the first pass of the other mill, such as that shown in Figs. 7 to 10, where the reducing action is continued in the same way. The blank can thus be easily and quickly reduced and handled while at the necessary high heat, and brought to the desired internal and external diameter. For this purpose, as above shown, the mandrel bars are of course increased in length according to the natural increase in the length of the blank, and the mandrels for each successive pass are made slightly smaller than the mandrels of the preceding pass, so that the blank will easily pass onto the mandrel, the blank being thus reduced in internal diameter as well as external diameter at each pass of the rolls.

What I claim as my invention, and desire to secure by Letters Patent, is—

1. The combination with rolls having concave passes, of movable tables on each side thereof adapted to support and carry the two blanks between the roll passes, of mandrels supported on the table and longitudinally movable thereon, and mechanism for carrying the tables with mandrels from one roll pass to the next and for carrying the mandrel longitudinally into and out of the roll passes, each mandrel being adapted to enter the blank delivered onto the table, and when carried to the next roll passes to move longitudinally into the pass, substantially as and for the purpose set forth.

2. The combination with rolls having concave passes, of a movable table adapted to support and carry the tube blank from one pass to the other, a mandrel supported and mounted so as to be longitudinally movable on said table, and mechanism for moving said mandrel longitudinally on the table, whereby the mandrel may be held in front of and in line with one roll-pass and enter the blank as it is fed therefrom and be carried by the table to the next roll-pass and moved longitudinally into said roll-pass, substantially as set forth.

3. The combination of rolls having concave roll-passes therein, movable tables mounted on each side of said rolls, longitudinally movable mandrels supported on each of said tables and adapted to be held in front of and in line with the roll-passes, and to enter the roll-passes, and movable supports for said mandrels at the forward end of the tables, substantially as set forth.

4. The combination of rolls having concave roll-passes therein, movable tables mounted on each side of said rolls, longitudinally movable mandrels supported on each of said tables and adapted to be held in front of and in line with the roll-passes, and to enter the roll-passes, said mandrels having geared faces at the ends of their mandrel bars meshing with power-driven pinions mounted on the tables, substantially as set forth.

5. The combination of a set of three-high rolls having concave roll-passes therein, a table on one side thereof having up and down movements and adapted to receive and support the tube blank, a longitudinally movable mandrel supported on said table, and a stationary guideway having a diagonal guiding slot with which the table engages to move it obliquely between the passes, substantially as set forth.

6. The combination of a set of three-high rolls having concave roll-passes therein, a table on one side thereof having up and down movements and adapted to receive and support the tube blank, a longitudinally movable mandrel supported on said table, a stationary guideway having a diagonal guiding slot with which the table engages to move it obliquely between the passes, and a stand or abutment having a slot therein corresponding to the guideway within which the mandrel bar fits, substantially as set forth.

7. The combination of a set of three-high rolls having concave roll-passes therein, a table on one side thereof having up and down movements and adapted to receive and support the tube blank, a longitudinally movable mandrel supported on said table, a stationary guideway having a diagonal guiding slot with which the table engages to move it obliquely between the passes, and a stand or abutment having a slot therein corresponding to the guideway within which the mandrel bar fits, said mandrel bar having a shoulder adapted to contact with the abutment.

8. The combination with rolls having roll-passes therein, of a movable table at one side of the rolls, said table carrying a series of power-driven rolls and a power-driven pinion and having at its forward end a movable mandrel support, and a longitudinally movable mandrel resting on such support and having a gear face at its rear end meshing with and supported on the power-driven pinion, substantially as set forth.

9. In tube rolling apparatus, the combination of rolls having roll-passes therein, a movable table on one side of said rolls, said table carrying a series of power-driven rollers and a power-driven pinion, and a longitudinally movable mandrel supported on the table and having a gear face at its rear end so as to hold the mandrel in line with one pass to receive the blank upon the rollers, and to feed the mandrel between another pass and by the pinion feed forward the mandrel, and by the power-driven rollers feed forward the blank into such pass, substantially as set forth.

In testimony whereof I, the said ZDENKO HOROVSKY, have hereunto set my hand.

ZDENKO HOROVSKY.

Witnesses:
J. G. NEVERLINE,
HARRY WISE.